US007198037B2

(12) United States Patent
Sayers et al.

(10) Patent No.: US 7,198,037 B2
(45) Date of Patent: Apr. 3, 2007

(54) BYPASS FOR EXHAUST GAS COOLER

(75) Inventors: Jon A Sayers, Warwick (GB); Stephane Reymondet, Birmingham (GB); Angus Lemon, Cerritos, CA (US); Willi J Smith, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 143 days.

(21) Appl. No.: 11/011,844

(22) Filed: Dec. 14, 2004

(65) Prior Publication Data

US 2006/0124114 A1 Jun. 15, 2006

(51) Int. Cl.

| | |
|---|---|
| ***F02M 25/07*** | (2006.01) |
| ***F02B 47/08*** | (2006.01) |
| ***F16K 11/09*** | (2006.01) |
| ***F28R 27/02*** | (2006.01) |
| *F28F 1/10* | (2006.01) |

(52) U.S. Cl. .................. 123/568.12; 165/103; 165/172

(58) Field of Classification Search ........... 123/568.11, 123/568.12, 568.2, 568.21, 563; 60/320, 60/599, 605.2; 165/41, 51, 52, 101, 103, 165/172, 174, 283, 297

See application file for complete search history.

(56) References Cited

U.S. PATENT DOCUMENTS 5,732,688 A * 3/1998 Charlton et al. ....... 123/568.12
6,718,956 B2 * 4/2004 Klipfel et al. ......... 123/568.12
6,868,840 B2 * 3/2005 Lewallen .................... 123/563
7,011,080 B2 * 3/2006 Kennedy ............... 123/568.12
7,032,577 B2 * 4/2006 Rosin et al. ........... 123/568.12
2005/0199381 A1 * 9/2005 Mercz et al. ............... 165/172

FOREIGN PATENT DOCUMENTS

| | | |
|---|---|---|
| EP | 1555421 | 7/2005 |
| FR | 2838500 | 10/2002 |
| WO | WO2006-024495 | 3/2006 |

* cited by examiner

*Primary Examiner*—Willis R. Wolfe, Jr.
(74) *Attorney, Agent, or Firm*—Chris James

(57) ABSTRACT

An exhaust gas recirculation cooler, typically of the drawn cup design, with a bypass and control valve is disclosed. The control valve can direct a proportion of the exhaust gas to the cooler and a proportion to bypass the cooler depending on the input temperature of the exhaust gas and the required temperature of the exhaust gas. The proportion of the exhaust gas directed to the cooler/bypassing the cooler can be varied as required and so the temperature of the exhaust gas can be controlled. One benefit of certain embodiments of the invention is that engine damaging chemicals, such as sulphuric acid, which result from over-cooling the exhaust gas are reduced.

18 Claims, 9 Drawing Sheets

BYPASS FOR EXHAUST GAS COOLER

BACKGROUND OF THE INVENTION

1. Field of the Invention

The present invention relates to a cooler for use in an exhaust gas recirculation (EGR) system in an internal combustion engine and particularly to a bypass around said cooler.

2. Description of the Related Art

Emissions regulations are requiring reduced emissions from vehicles, particularly the Euro 5, Bin 5 and US 06 regulations. To reduce the generation of nitrous oxides, it is known to recirculate exhaust gas through the engine. Under normal conditions the exhaust gas must be cooled before recirculation and it is known to pass the exhaust gas through an exhaust gas cooler. However, under "cold start" or low operating conditions, the gas can be over-cooled resulting in increased hydrocarbon emission and $CO_2$ production.

SUMMARY OF THE INVENTION

Thus an object of the present invention is to recirculate exhaust gas without over-cooling.

According to a first aspect of the present invention there is provided an exhaust gas cooler comprising:

- an exhaust gas inlet;
- an exhaust gas outlet;
- at least one coolant channel arranged between the exhaust gas inlet and exhaust gas outlet;
- a coolant inlet and a coolant outlet in fluid communication with the coolant channel;

at least one exhaust gas passage adjacent to the at least one coolant channel and in fluid communication with the exhaust gas inlet and exhaust gas outlet;

- a bypass passage; and,
- a gas direction mechanism moveable to at least three positions, each position adapted to direct a different proportion of the exhaust gas between the at least one exhaust gas passage and the bypass passage.

The at least one exhaust gas passage is typically adapted to exchange more heat than the bypass passage. Preferably the heat exchange within the bypass passage is minimized, although for certain embodiments the bypass passage may provide a heat exchanger with less efficiency in terms of heat exchange than the exhaust gas passage. Preferably the coolant channels are formed from a pair of plates attached to one another.

Preferably the gas direction mechanism comprises a valve. Preferably the gas direction mechanism is adapted to move from a first position where substantially all of the exhaust gas is directed through the bypass passage, to a second position where substantially all the exhaust gas is directed through the exhaust gas passage and also to at least one further position where a proportion of exhaust gas is directed through the bypass passage and a proportion of the exhaust gas is directed through the exhaust gas passage. The gas direction mechanism is typically able to move from each said position to any other said position directly. For example the gas direction mechanism can move from the first position to the at least one further position directly without moving to the second position.

Preferably there are more than three positions. Indeed the gas direction mechanism can preferably be adapted to adopt any intermediate position between the first and second positions.

Typically the gas direction mechanism has a first face adapted to close a first aperture in order to direct the exhaust gas through the bypass passage and has a second face adapted to close a second aperture in order to direct the exhaust gas through the exhaust gas passage.

Preferably the cross-sectional size of the gas direction mechanism is greater than the cross-sectional size of the aperture such that the gas direction mechanism is supported by the area around each aperture when in the respective first and second positions.

Preferably the gas direction mechanism comprises a first face which possesses rotational symmetry. Preferably the gas direction mechanism comprises opposite faces, each comprising rotational symmetry.

Optionally a face of the gas direction mechanism has a conical shape. The gas direction mechanism can comprise a first conical face and a second conical face.

The first and second faces may be at an angle of between 20–40° to each other although larger angles of, for example, up to 80° are also possible. For certain embodiments the first and second faces are not at an angle to each other—that is the second face is on the opposite side of the first face.

Preferably the bypass passage is enclosed in a housing. Preferably the housing is provided with a series of corrugations, typically to eliminate fatigue failure due to differential thermal expansion stress.

The bypass passage may be spaced away from the at least one exhaust gas passage by an insulating channel. The insulating channel may, in use, be evacuated or may contain gas, preferably hot gas.

In alternative embodiments the gas direction mechanism may comprise a sleeve with an inlet and at least one outlet.

The sleeve may be axially displaceable. Preferably the sleeve is axially displaceable such that the outlet is alignable substantially exclusively with the exhaust gas passage, substantially exclusively with the bypass passage or an intermediate position where a proportion of the exhaust gas is directed to the exhaust gas passage and a proportion of the exhaust gas is directed to the bypass passage.

In alternative embodiments the sleeve may be rotatably displaceable rather than axially displaceable. Preferably such a sleeve comprises two apertures, rotationally spaced from each other, more preferably longitudinally spaced away from each other. Typically the sleeve is adapted to direct exhaust gas exclusively to the exhaust gas passage, exclusively to the bypass passage or an intermediate position where a proportion of the exhaust gas is directed to the exhaust gas passage and a proportion of the exhaust gas is directed to the bypass passage.

Optionally there are at least two coolant channels which are adapted to allow coolant to flow therethrough at differing rates. Typically the first of the at least two coolant channels is adapted to allow coolant to flow therethrough at a greater rate compared to the rate at which coolant is allowed to flow through the second of the at least two coolant channels.

Typically coolant inlets of the respective coolant channels are sized to provide for such differing flow rate of coolant. Optionally an obstacle, such as a plate, is provided within the second of the at least two coolant channels to slow the rate at which coolant can flow therein. Typically the second coolant channel is adjacent the bypass passage.

According to a second aspect of the present invention there is provided a bypass assembly for connection to an exhaust gas cooler; the bypass assembly comprising a gas direction mechanism to direct a proportion of the exhaust gas to an exhaust gas cooler and a proportion of the exhaust gas to a bypass passage.

Preferably the gas direction mechanism is the gas direction mechanism according to earlier aspects of the invention.

According to a further aspect of the invention, there is provided a method of manufacturing an exhaust gas cooler, wherein:

the exhaust gas inlet;

the exhaust gas outlet;

the at least one coolant channel;

the coolant inlet and the coolant outlet; and the at least one exhaust gas passage;

are first brazed together in a furnace and then the bypass passage and gas direction mechanism are attached thereto.

According to a yet further aspect of the present invention there is provided a method of cooling exhaust gas, the method comprising:

(i) providing an exhaust gas cooler comprising:

an exhaust gas inlet;

an exhaust gas outlet;

at least one coolant channel arranged between the exhaust gas inlet and exhaust gas outlet and having a coolant inlet and a coolant outlet in fluid-communication with the coolant channel;

at least one exhaust gas passage adjacent to the at least one coolant channel and in fluid communication with the exhaust gas inlet and exhaust gas outlet;

a bypass passage; and, (ii) directing a proportion of the exhaust gas to the at least one exhaust gas passage and a proportion of-the exhaust gas to the bypass passage.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
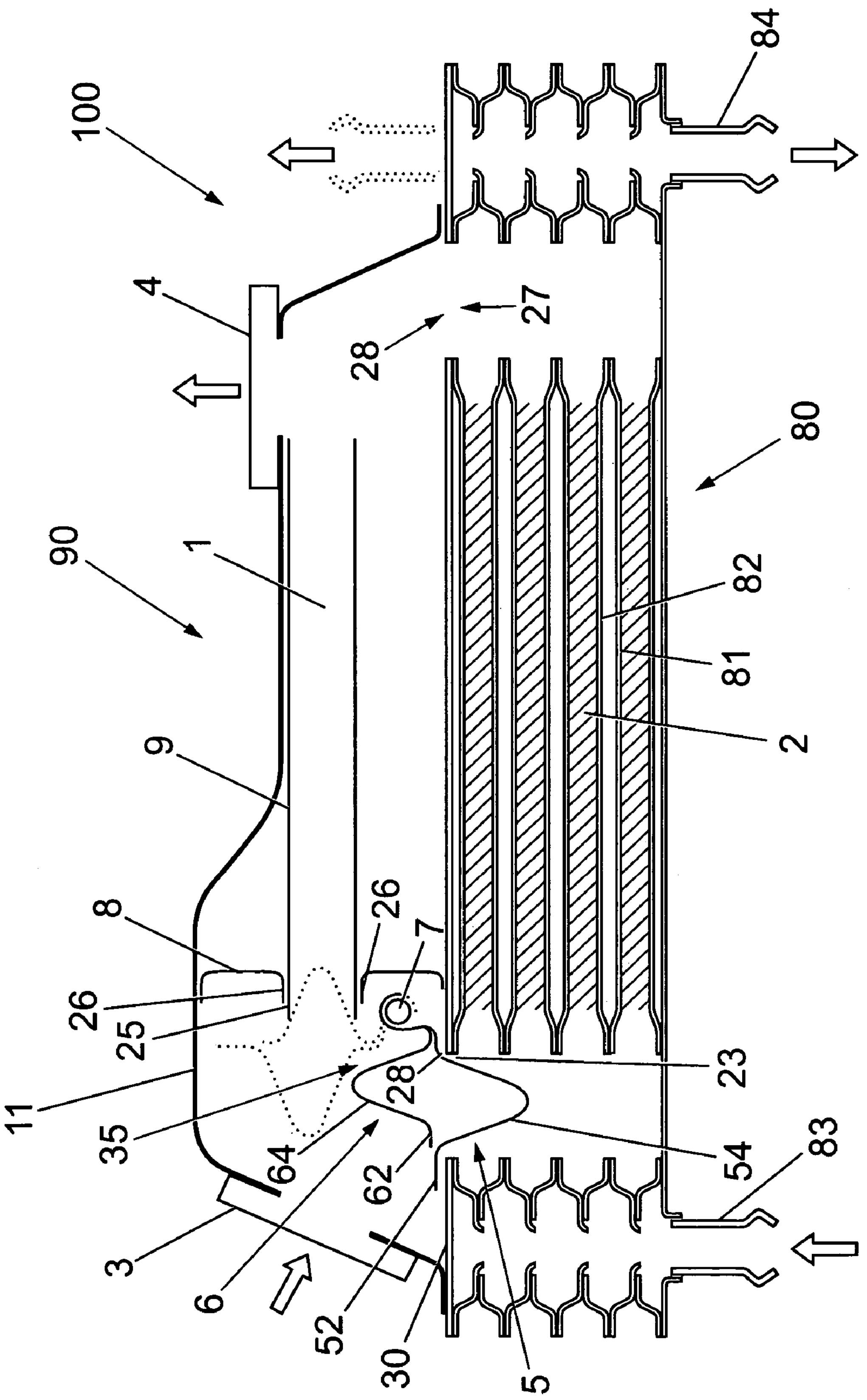
FIG. 1 is a sectional side view of a first embodiment of an exhaust gas cooler with bypass in accordance with the present invention.
Figure 2:
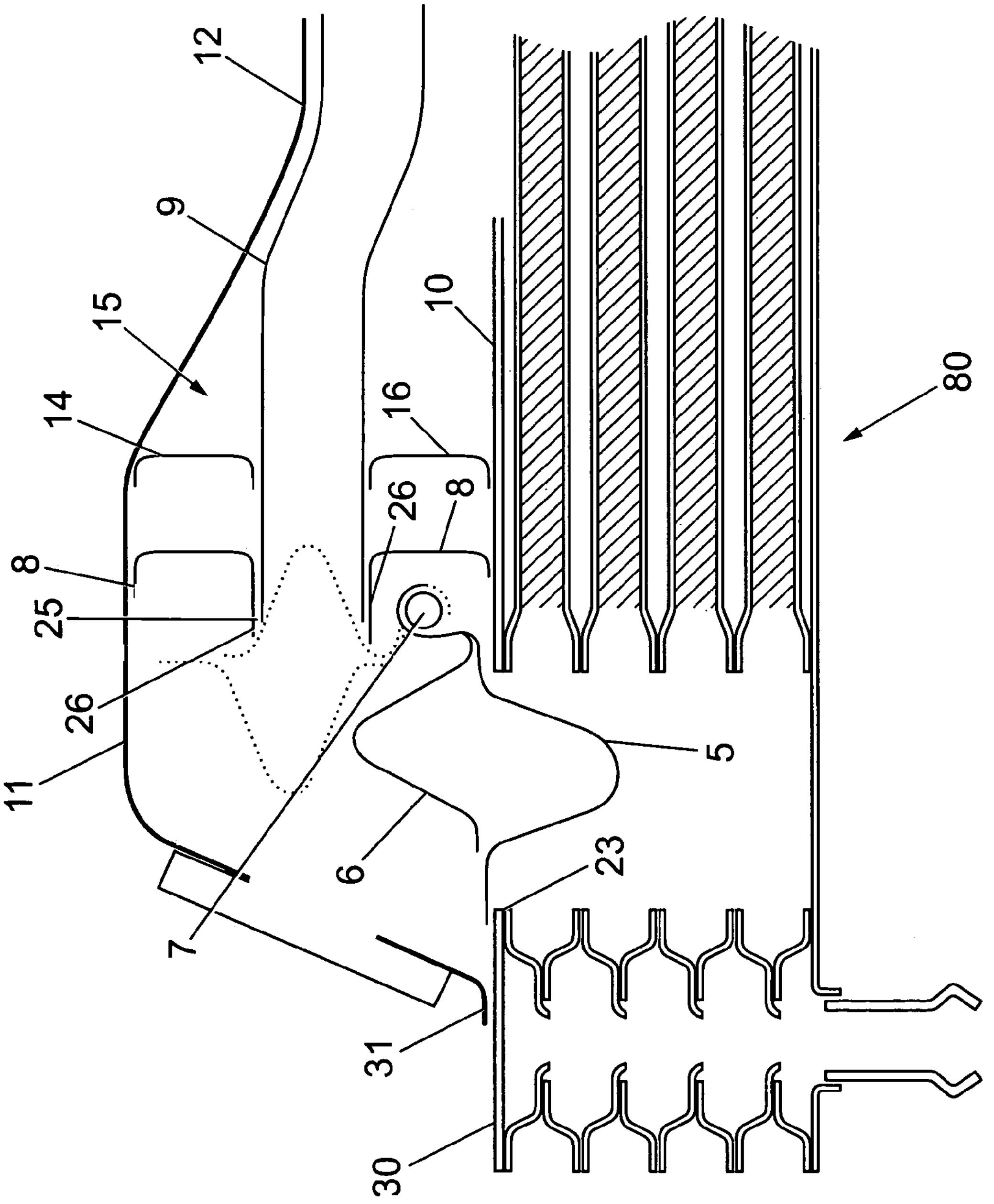
FIG. 2 is an enlarged view of the exhaust gas cooler with bypass of FIG. 1.
Figure 3:
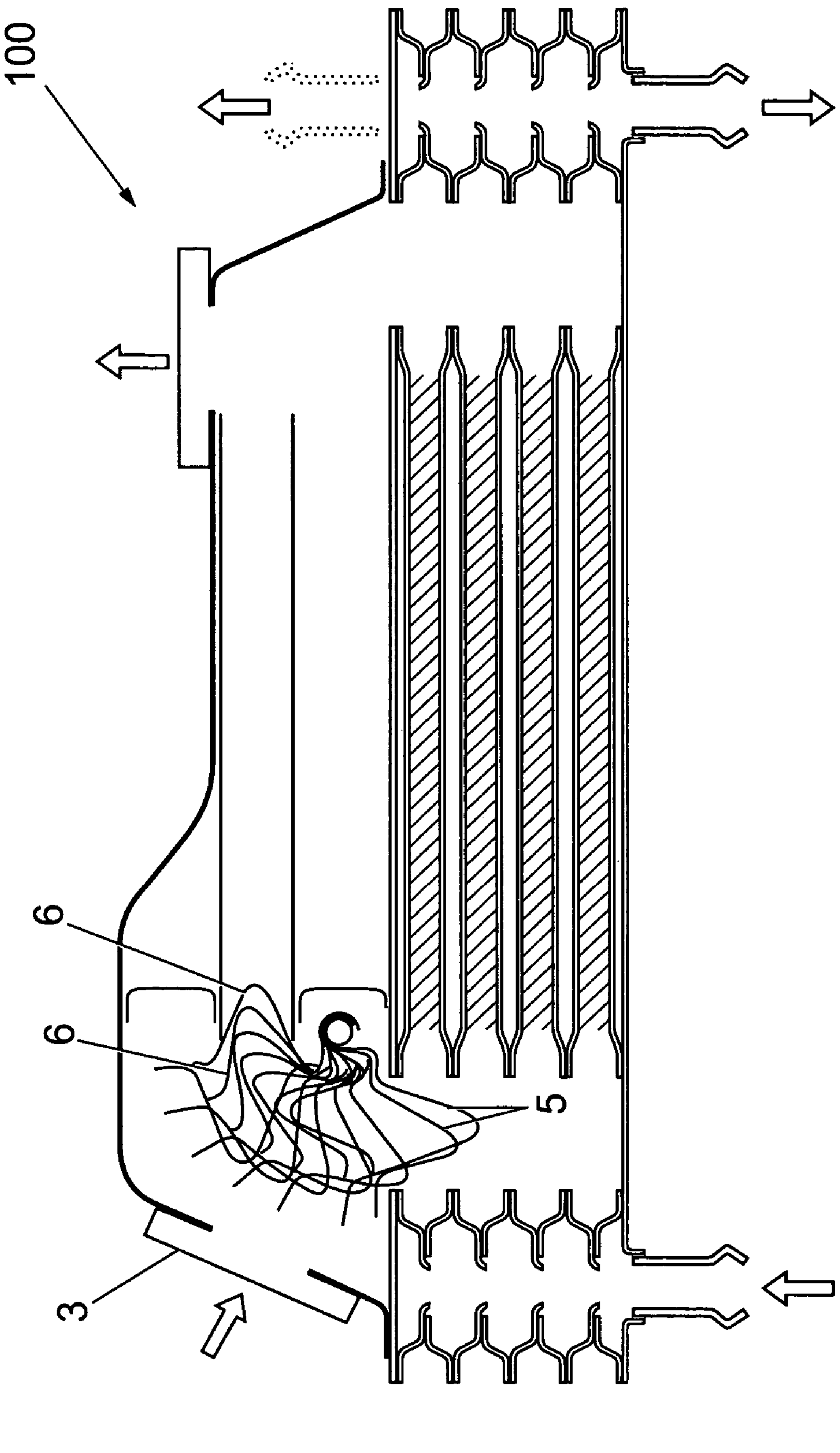
FIG. 3 is a further sectional side view of the exhaust cooler with bypass of FIG. 1, showing a variety of valve positions.

An exhaust gas cooler with bypass 100 is shown in FIGS. 1–3 and comprises an exhaust gas recirculation (EGR) cooler 80 and an attached bypass assembly 90.

The bypass assembly 90 comprises a bypass housing 11 attached to the EGR cooler 80. The bypass housing 11 comprises an exhaust gas inlet 3, an exhaust gas outlet 4, a bypass tube 9, a sealing plate 8 and an open face 28 which interfaces with the EGR cooler 80.

The bypass seal 8 comprises a plate with an aperture 25 and seals the bypass housing 11 with the cooler 80, allowing exhaust gas to proceed only through the aperture 25 towards the outlet 4 or through open face 28 into the port 23 of the EGR cooler 80. The bypass seal 8 is welded to the housing 11 at one end but interfaces with the EGR cooler 80 by way of an interference fit and is preferably not welded thereto. This allows the bypass seal 8 to move slightly should the components expand and contract due to temperature variances.

The bypass tube 9 is placed within the aperture 25. Further supports 14, 16 may be provided to hold the bypass tube 9 in place. The bypass tube 9 is spaced away from the exhaust gas cooler 80 in order to reduce heat loss from the exhaust gas during the bypass mode. Thus a void 15 typically filled with warm gas is provided between the bypass tube 9 and the EGR cooler 80. The bypass tube 9 is preferably straight in order to minimize manufacturing complexity, but can be bent as shown in FIG. 2. For packaging constraints, the housing 11 may be minimized at 12 in order to compact the bypass cooler 100. Alternative embodiments may not include a bypass tube 9—the bypassing gas can flow through the aperture 25 and thereafter through the outlet 4.

The aperture 25 comprises a rim 26 extending out from the plane of the bypass seal 8 towards the inlet 3 which helps support the bypass tube 9 therein and form a seal with a valve 6, as described below.

The open face 28 of the bypass assembly 90 is aligned with an inlet port 23 and an outlet port 27 of the EGR cooler 80. The EGR cooler 80 is of a drawn cup design which comprises a series of plate pairs 81, 82 which form coolant flow channels therebetween through which a coolant, such as water, flows. Exhaust gas is directed in the passages 2 between these coolant channels and the heat in the exhaust gas is absorbed by the coolant flowing through the coolant flow channels.

The inlet 3 and outlet 4 of the bypass housing 11 can be mounted at a tilted angle as shown in the Figures, or at a vertical or horizontal angle depending on the specific requirements for connection to the engine. Any suitable interface may be used such as welded tubes, brazed tubes, integrated flanges, V band clamps, etc.

Exhaust gas can therefore proceed from the inlet 3 into the exhaust gas cooler 80 via the open face 28 and aligned port 23, through the passages 2 between the plate pairs 81 & 82, out of the EGR cooler 80 through the aligned ports 27, 29 and out of the bypass housing 11 through the outlet 4. Alternatively the exhaust gas can proceed from the inlet 3 through the bypass tube 9 and out of the outlet 4—bypassing the EGR cooler 80. A valve assembly 35, described below, determines the proportion of exhaust gas which proceeds in each direction.

The valve assembly 35 comprises a main cooler valve 5 pivotally mounted to a valve stem 7 and adapted to, seal the open face 28 at the port 23 of the EGR cooler to prevent exhaust gas entering the EGR cooler 80 and being cooled. When the valve 5 is in the closed position (that is, sealing the port 23) the exhaust gas will proceed through aperture 25 in the bypass seal 8, the bypass tube 9 and the outlet 4, therefore bypassing the EGR cooler 80.

Affixed to the bypass side of the main cooler valve 5 is a further valve, referred to as a bypass valve 6. The bypass valve 6 pivots with the main cooler valve 5 and is adapted to seal the aperture 25 in the bypass seal 8 and prevent exhaust gas entering the bypass tube 9. When the bypass valve 6 is in the closed position, it seals the bypass tube 9 and prevents exhaust gas extending therethrough. Also, since the main cooler valve 5 is affixed to the bypass valve 6, the port 23 of the EGR cooler 80 is open when the bypass valve 6 is in its closed position. In this position therefore, all the exhaust gas proceeds through the open face 28 and port 23 of the EGR cooler 80 and is cooled.

The valves 5, 6 may also be pivoted to an intermediate position so that a proportion of the exhaust gas proceeds in each of the two directions.

Each valve 5, 6 comprises a flange portion 52, 62 respectively and an outwardly projecting conical portion 54, 64 respectively. The flange 52 of the valve 5 is sized to be greater than the circular port 23 and thus abuts with the main body 30 of the exhaust gas cooler 80 to provide a seal. In a similar manner, the flange portion 62 of the valve 6 is larger than the aperture 25 and thus abuts with the rim 26 in order to form a seal.

Advantages of certain embodiments of the present invention is the greater size of the valves than the ports/apertures which they are sealing. This reduces the load on the valve stem since the valves abut against the edge of the port or aperture when closed. This significantly reduces the likelihood of failure of the stem which is typically the weakest part in bypass configurations.

In use, the valves 5, 6 can be pivoted so that they are placed in an intermediate position allowing a proportion of the exhaust gas to pas through the open face 28 and onwards through the EGR cooler 80 and be cooled, and allowing a proportion to pass through the bypass tubing 9 without being cooled. In this way the degree of cooling of the exhaust gas is modulated providing for accurate temperature control of the exiting exhaust gases. The conical portions 54, 64 affect the exhaust gas flow over the valves 5, 6 and allow greater control of the modulation by increasing the degree of rotation required to direct various proportions of exhaust gas to the bypass 9 or EGR cooler 80. For example, when the valve 5 is pivoted away from its closed position by a small degree (~5°), much of the conical portion 54 will remain in the port 23 allowing the exhaust gas to proceed only through a ring-shaped space between the conical portion 54 and the edge of the port 23. As the valve 5 is pivoted further away from the port 23 the ring-shaped space increases in size allowing more exhaust gas to enter the port 23. This aids control of the proportion of exhaust gas to be cooled and thus accurate control of the temperature at which the exhaust gas exits the EGR cooler with bypass 100. The proportion of the exhaust gas directed to the cooler 80 or bypass 9 can be varied as required.

FIG. 3 shows the exhaust gas cooler/bypass 100 with the valve in a number of different positions, each of which correspond to a degree of cooling of the exhaust gas entering the inlet 3.

Alternative embodiments may include only a valve for opening or closing the route to the bypass assembly and do not include a valve for opening or closing the route to the EGR cooler. Thus if the bypass valve is open most of the air will proceed through the bypass assembly because the pressure drop of proceeding through the EGR cooler is greater. If valve is closed, the air will pass through the EGR cooler. Such embodiments save on the cost of providing two valves.

Alternative embodiments may also utilize a differently shaped portion on the valves in order to optimize flow modulation—the shape does not necessarily have to be conical.

Assembly of the EGR cooler/bypass 100 is straightforward. An existing EGR cooler may be used without modification and the bypass assembly attached thereto by either brazing or preferably welding.

Alternatively a new EGR cooler may be manufactured which typically includes the step of brazing the EGR cooler. The bypass assembly is preferably welded to the EGR cooler after the brazing step. This increases the furnace capacity and eliminates the need to put the valve components 5, 6 through the brazing step.

The bypass valve 6 can be fixed to the valve 5 by any suitable method such as welding or crimping.

Figure 6:
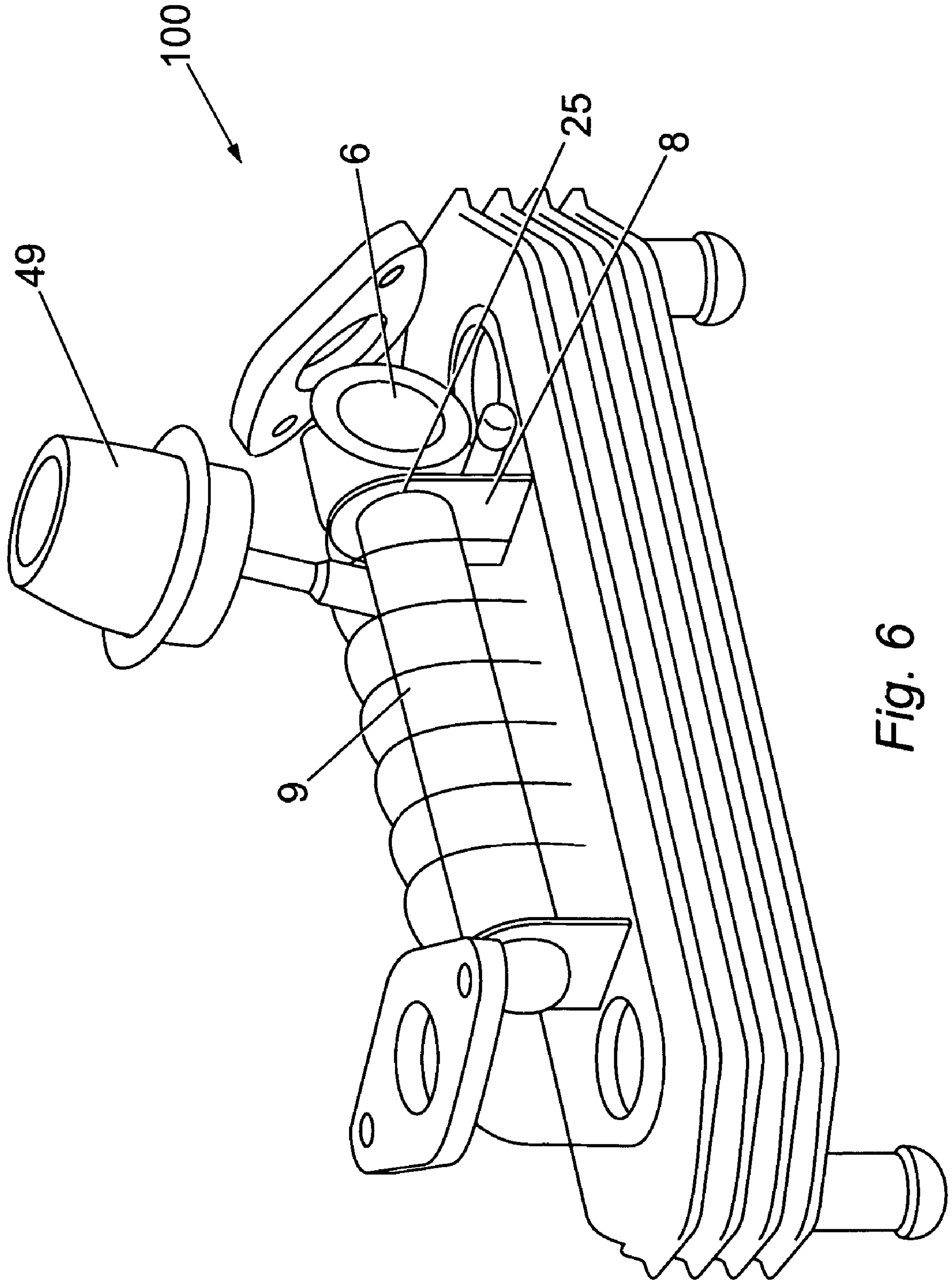
FIG. 6 is an external perspective view of the exhaust gas cooler with bypass of FIG. 4.
Figure 7B:
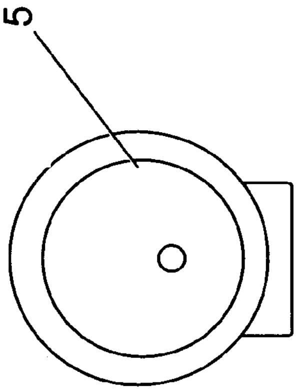
FIG. 7*b* is a top view of the valve of FIG. 7*a;*
Figure 7A:
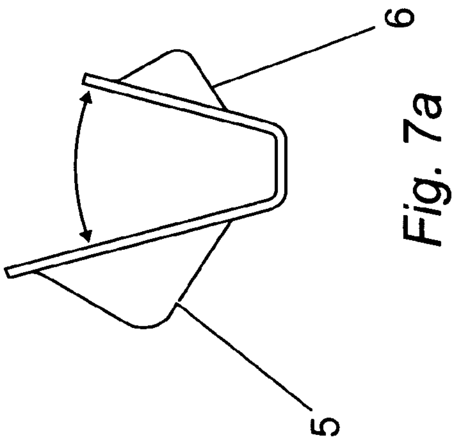
FIG. 7*a* is a side view of a valve used within the exhaust gas cooler with bypass of FIG. 4.
Figure 7C:
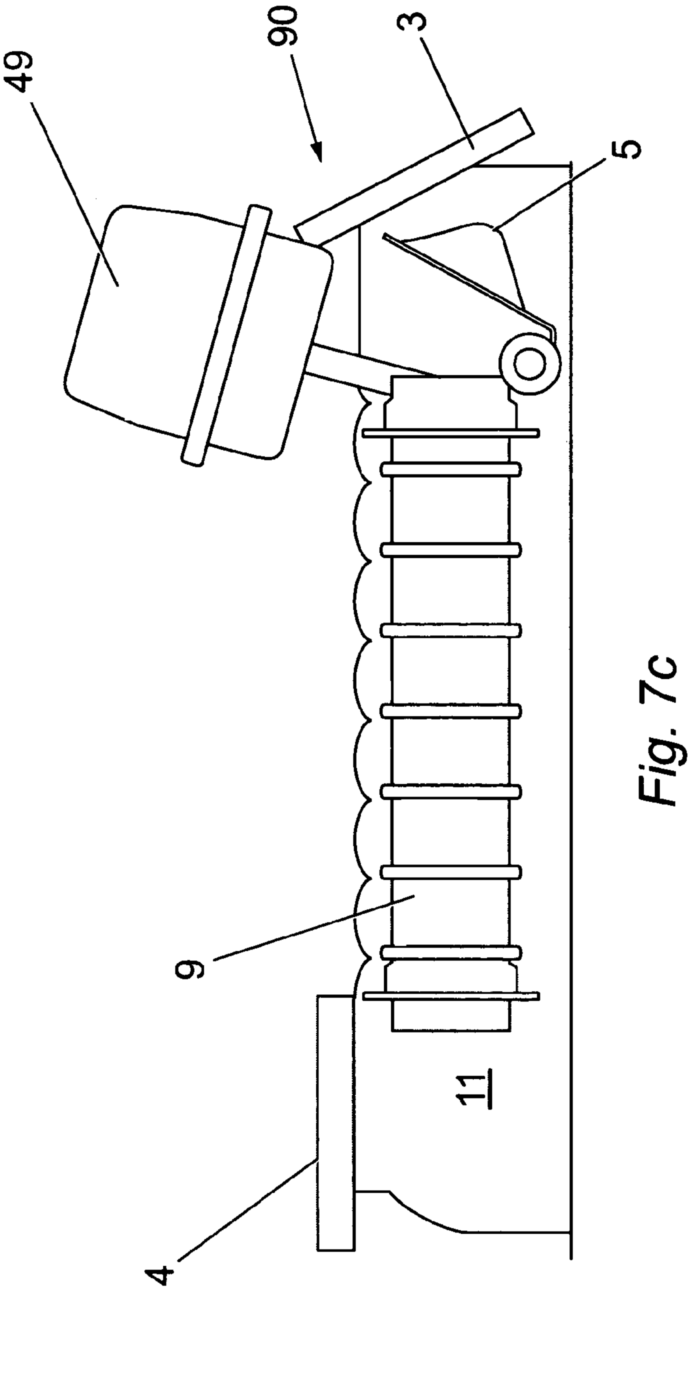
FIG. 7*c* is a side view of the bypass assembly of the FIG. 4 exhaust gas cooler with bypass.

The valve stem 7 is bushed, optionally sealed and operated by an actuator or crank mechanism 49 (shown only in FIGS. 6, 7*c*). The stem is raised off the top of the bypass housing 11 to allow clearances for manufacturing/operation strength on the housing 11 and space for packaging the bushes and seals (not shown).

Pneumatic or electric actuator (not shown) can be used to control the valve stem 7. The actuator is controlled by an Engine Control Unit (ECU), which can take work in a number of different ways. It can take simple temperature measurements of the coolant and/or the exhaust gas and modulate the proportion of gases which bypass depending on the temperatures detected. Alternatively or additionally a load versus speed map may be programmed into the ECU to modulate the proportion of uncooled exhaust gas required. The richness of the air/fuel mix may be assessed as can the combustion temperature and the temperature of different engine components. All these factors can be used in a calculation to determine the proportion of exhaust gas which is cooled. A combination of these control mechanisms may also be utilized.

Figure 4:
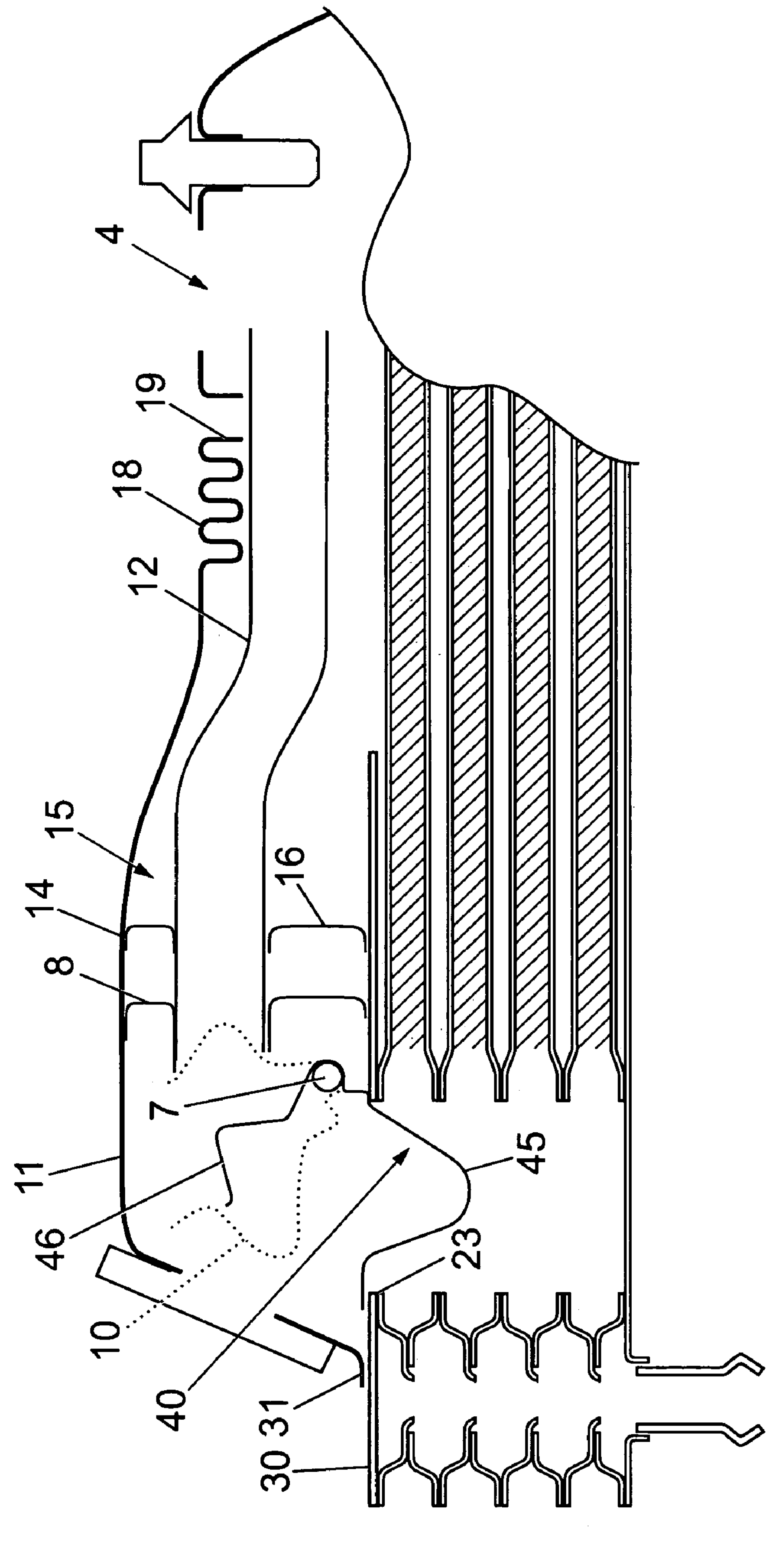
FIG. 4 is a sectional side view of a second embodiment of the exhaust cooler with bypass in accordance with the present invention.
Figure 5:
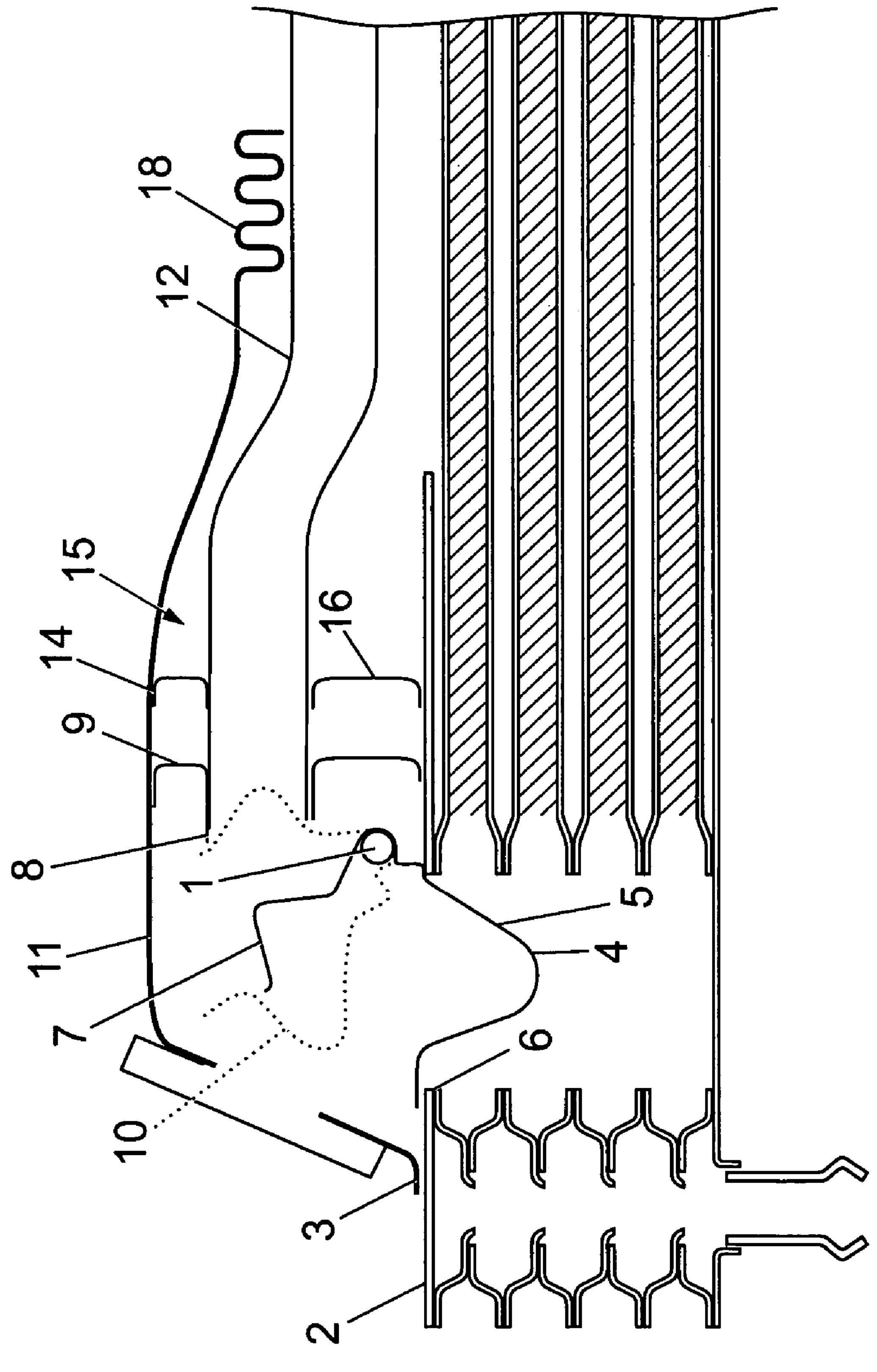
FIG. 5 is an enlarged view of the exhaust gas cooler with bypass of FIG. 4.

A second embodiment of a gas bypass cooler is shown in FIGS. 4 and 5. The second embodiment is largely similar to the previous embodiment and like parts share common reference numerals.

One particular difference is that a valve 40 is provided as a single piece with faces 45, 46 corresponding to the valves 5, 6 of the previous embodiment. Moreover, the face 45 if the valve 40 is at an angle of around 30° to the face 46 of the valve 40. The single-piece valve 40 reduces the movement required to seal the cooler or the bypass which reduces the required height of the housing 31. Manufacture of a single piece valve is also simpler than two valves 5, 6 fixed together. The valves 5, 6 may be manufactured at a variety of angles to each other, for example from 10°–80°.

In other embodiments the valves may be formed from two pieces attached to each other at an angle or formed as a single piece with no angle between them.

The side of housing 31 has corrugations 18 which cope with the thermal expansion of the bypass tube 9 and bypass housing 12 more rapidly than the EGR cooler 80. (Typically the bypass housing 12 and tube 9 will be exposed to temperatures of over 500° C. to 600° C. whereas the EGR cooler 80 is exposed to temperatures of up to 120° C.)

A screw 41 may be provided for attachment to the exhaust gas recirculation tube/manifold (not shown). A perspective view of the exhaust gas coolers/bypasses shown in FIGS. 6, 7*c*. A pneumatic activator 49 to control the valve stem 7 is also shown there.

Figure 8:
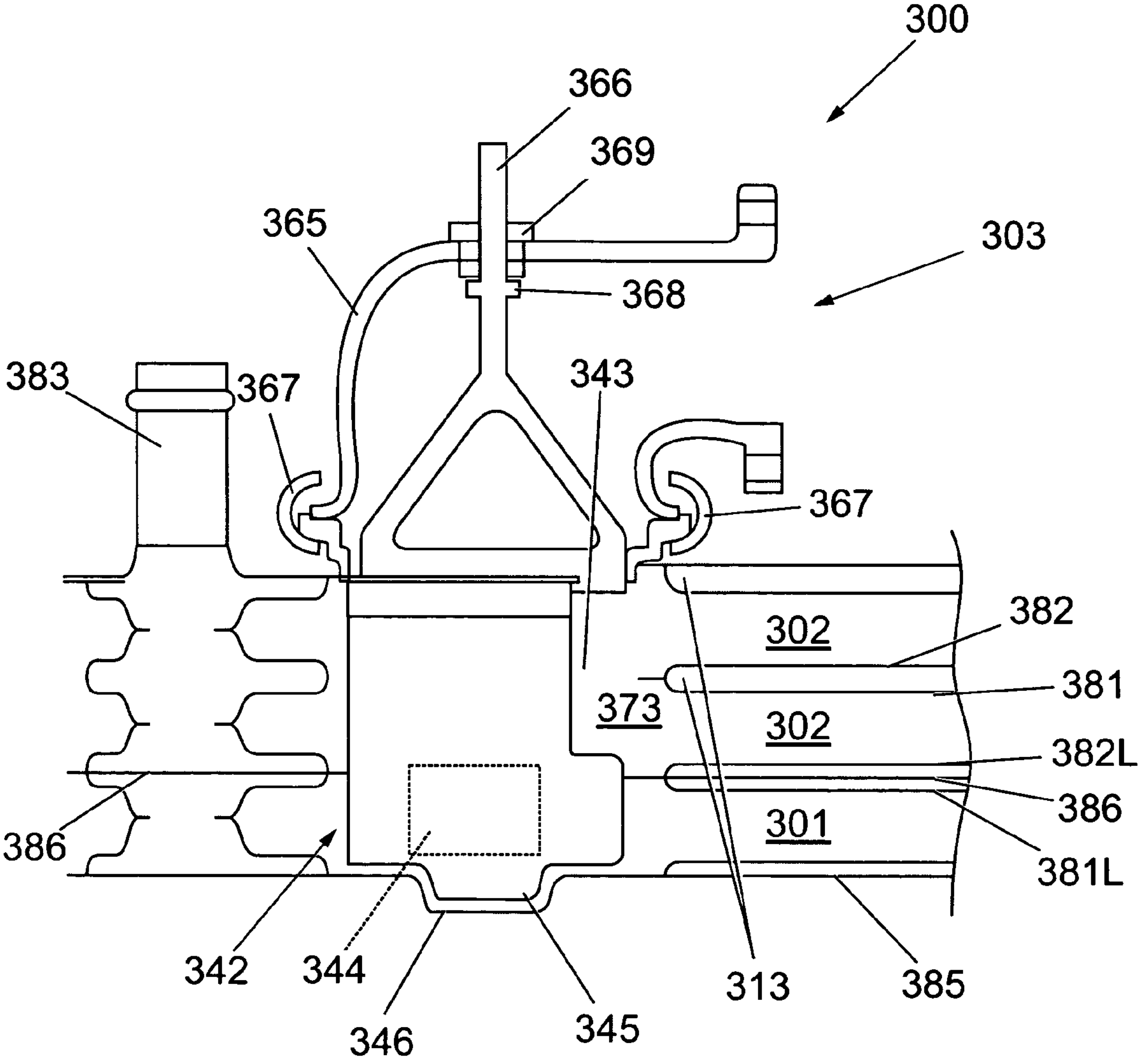
FIG. 8 is a partial side sectional view of a third embodiment of an exhaust gas cooler with bypass in accordance with the present invention.
Figure 9A:
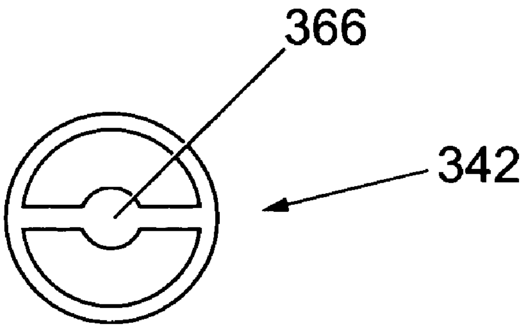
FIG. 9*a* is a top view of a sleeve which forms part of the exhaust gas cooler with bypass of FIG. 8.
Figure 9B:
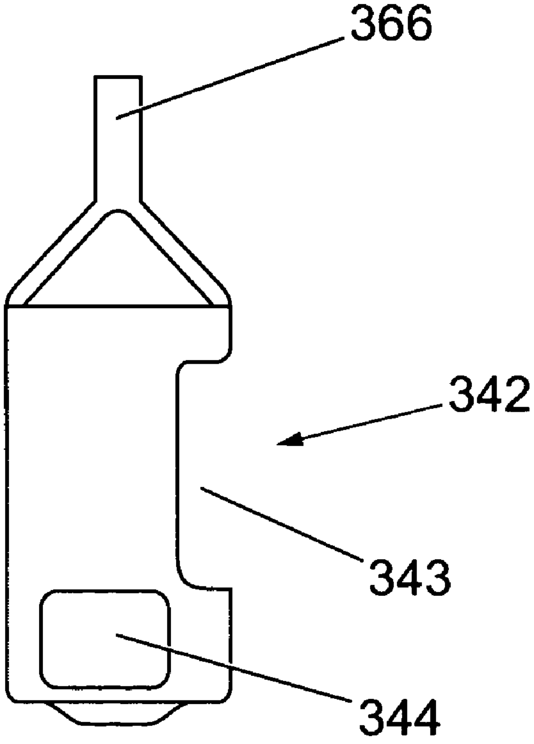
FIG. 9*b* is a side view of the sleeve of FIG. 9*a*.
Figure 9C:
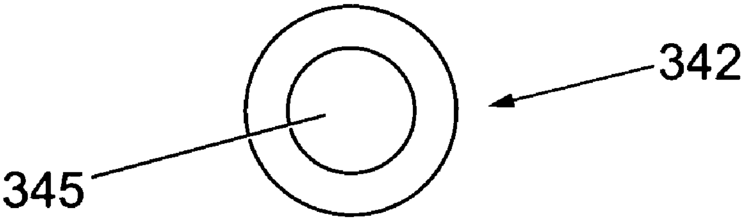
FIG. 9*c* is a bottom view of the sleeve of FIG. 9*a*.

A third embodiment of a EGR cooler with bypass 300 is shown in FIG. 8. The EGR cooler is also of the drawn cup design and therefore includes a series of plate pairs 381, 382 which form coolant flow channels therebetween. (In practise, more plate pairs 381, 382 are commonly provided than shown in the drawings.)

The channels are in fluid communication with a coolant inlet 383 and coolant outlet (not shown).

Between the plate pairs 381 & 382, cooling passages 302 are formed through which hot exhaust gas can flow. A bypass passage 301 is provided between a lowermost plate pair 381L, 382L and a bottom 385 of the cooler 300.

The bypass passage 301 is essentially an additional heat exchanger section with lower performance than that of the cooling passages 302 but will be referred to hereinafter as a bypass passage. A degree of heat exchange will take place in the bypass passage 301, although this is less than the heat exchange which will take place in the cooling passages 302. This is taken into account by an engine control unit and thus modulated temperature control of the exhaust gas can still be achieved. Thus the present embodiment allows for exhaust gas to pass through heat exchangers of differing performance. The heat exchange in the second heat exchanger or bypass passage 301 may be negligible if required, but not necessarily so.

Coolant flows at a lower rate through the channel between the lowermost plate pair 381L, 382L in contrast to the other plate pairs by means of a smaller inlet port (not shown). A division plate 386 is also provided between the lowermost plate pairs 381L, 382L in order to increase the insulation between the bypass 301 and cooling 302 passages. The division plate 386 also serves to reduce the flow rate of the coolant and thus the heat exchange within the bypass passage 301.

Circular ports are provided in the plates 381, 382 to allow for exhaust gas to enter the space between the plates 381, 382. These ports are aligned and a cylindrical void 373 is created.

A rotatable cylindrical sleeve valve 342 is provided in the void 373. A boss 345 on its bottom locates in recess 346 on the bottom 385 of the cooler/bypass 300. The sleeve 342 and is open at its top end for communication with an exhaust gas inlet 303 and has exit ports 343, 344. The exit ports 343, 344 are rotationally and longitudinally spaced apart from each other.

The first exit port 343 is longitudinally aligned with the cooling passages 302 whereas the second port is longitudinally aligned with the bypass passage 301. The ports 343, 344 are rotationally spaced apart from each other such that rotation of the sleeve around its main axis can allow exhaust gas to selectively exit via one of the two ports 343, 344 exclusively or a combination of the two ports 343, 344. Thus by rotating the sleeve 342, exhaust gas can be directed through the cooling passages 302 and be cooled or through the bypass passage 301 where it is not cooled.

The sleeve 342 can also be turned so that a portion of the first and second ports 343, 344 are aligned with the cooling and bypass passages respectively. This provides for modulated cooling, that is allowing any proportion of exhaust gas to be cooled whilst allowing the rest of the exhaust gas to proceed through the bypass. Thus the temperature of the exhaust gas exiting the cooler can be accurately controlled and it is not necessary to have all the exhaust gas passing through the cooler or the bypass at one time.

In alternative embodiments (not shown) a similar cylindrical sleeve may be provided but with only a single axial exit port. The sleeve is then, in use, displaced axially in order to direct the exhaust gases through the cooling or bypass passages or a combination of cooling or bypass passages where partial cooling is required.

An L-shaped pipe 365 is attached to the cooler via a V-band connection such as Marmon™ flanges 367 and is onwardly connected to the exhaust gas output of the engine (not shown).

An actuator rod 366 controls the rotation of the sleeve 342. The sleeve 342 can be pneumatically or electrically actuated. The rod 366 extends through the L-shaped pipe 365 and has a collar 368 and bushing 369 on either side of the pipe 365.

Thus in use, coolant enters the coolant inlet 383 and proceeds through the passages formed between plate pairs 381, 382. Coolant may or may not proceed through the lowermost plate pairs 381L, 382L. For certain embodiments, a small amount of cooling is preferred in the bypass passage 301 and coolant can proceed through the lowermost plate pairs 381L, 382L. For other embodiments, no coolant is allowed to flow through the lowermost plate pairs 381L, 382L in order to minimize cooling in the bypass passage 301.

Exhaust gas enters the inlet 303 and proceeds through the pipe 365 into the bore of the sleeve 342. Depending on the rotational orientation of the sleeve 342, exhaust gas can proceed either through the exit port 343 and thereafter through the cooling passages and be cooled by contact with the plate pairs 381, or through the exit port 344 and bypass the cooling passage 302. If the sleeve 342 is rotated so that the port 343 is partially aligned with the cooling passages 302 and the port 344 is partially aligned with the bypass passage 301, the net affect on the exhaust gas will be partial cooling. The extent of cooling can be controlled by the degree of rotation of the sleeve 342.

An advantage of certain embodiments of the present invention is the compact size afforded by the sleeve valve.

Modifications and improvements may be made without departing from the scope of the invention for example, the exhaust gas may be directed through the EGR cooler/bypass in an opposite direction, with the valve therefore being provided at the colder, output end.

We claim:

1. An exhaust gas cooler comprising:

an exhaust gas inlet;

an exhaust gas outlet;

at least one coolant channel arranged between the exhaust gas inlet and exhaust gas outlet;

a coolant inlet and a coolant outlet in fluid communication with the coolant channel;

at least one exhaust gas passage adjacent to the at least one coolant channel and in fluid communication with the exhaust gas inlet and exhaust gas outlet;

a bypass passage; and, a gas direction mechanism moveable to at least three positions, each position adapted to direct a different proportion of the exhaust gas between the at least one exhaust gas passage and the bypass passage.

the gas direction mechanism comprising a sleeve with an inlet and at least one outlet, wherein the sleeve being axially displaceable such that the at least one outlet is alignable:

(i) substantially exclusively with the at least one exhaust gas passage;

(ii) substantially exclusively with the bypass passage; or, (iii) partially aligned with the exhaust gas passage and partially aligned with the bypass passage.

2. A bypass assembly for connection to an exhaust gas cooler; the bypass assembly comprising a bypass passage and a gas direction mechanism moveable to more than three positions, each position adapted to direct a different proportion of the exhaust gas between the exhaust gas cooler and the bypass passage.

3. An exhaust gas cooler comprising:

an exhaust gas inlet;

an exhaust gas outlet;

at least one coolant channel arranged between the exhaust gas inlet and exhaust gas outlet;

a coolant inlet and a coolant outlet in fluid communication with the coolant channel;

at least one exhaust gas passage adjacent to the at least one coolant channel and in fluid communication with the exhaust gas inlet and exhaust gas outlet;

a bypass passage; and, a gas direction mechanism moveable to at least three positions, each position adapted to direct a different proportion of the exhaust gas between the at least one exhaust gas passage and the bypass passage, the gas direction mechanism comprising a sleeve with an inlet and at least one outlet wherein the sleeve is rotatably displaceable.

4. An exhaust gas cooler as claimed in claim 3, wherein the sleeve comprises two outlets, rotationally and longitudinally spaced from each other.

5. An exhaust gas cooler comprising:

an exhaust gas inlet;

an exhaust gas outlet;

at least one coolant channel arranged between the exhaust gas inlet and exhaust gas outlet;

a coolant inlet and a coolant outlet in fluid communication with the coolant channel; at least one exhaust gas passage adjacent to the at least one coolant channel and in fluid communication with the exhaust gas inlet and exhaust gas outlet;

a bypass passage; and, a gas direction mechanism moveable to at least three positions, each position adapted to direct a different proportion of the exhaust gas between the at least one exhaust gas passage and the bypass passage;

the gas direction mechanism being adapted to move from a first position where substantially all of the exhaust gas is directed through the bypass passage, to a second position where substantially all the exhaust gas is directed through the exhaust gas passage and also to a third position where a proportion of exhaust gas is directed through the bypass passage and a proportion of the exhaust gas is directed through the exhaust gas passage;

the gas direction mechanism having a first face adapted to close a first aperture in order to direct the exhaust gas through the bypass passage and a second face adapted to close a second aperture in order to direct the exhaust gas through the exhaust gas passage;

wherein at least one of the faces comprises a conical face.

6. An exhaust gas cooler as claimed in claim 5, wherein the gas direction mechanism comprises a first conical face and a second conical face.

7. An exhaust gas cooler as claimed in claim 6, wherein the first and second conical faces are at an angle of between 20–40° to each other.

8. An exhaust gas cooler comprising:

an exhaust gas inlet;

an exhaust gas outlet;

at least one coolant channel arranged between the exhaust gas inlet and exhaust gas outlet;

a coolant inlet and a coolant outlet in fluid communication with the coolant channel;

at least one exhaust gas passage adjacent to the at least one coolant channel and in fluid communication with the exhaust gas inlet and exhaust gas outlet;

a bypass passage; and, a gas direction mechanism moveable to more than three positions, each position adapted to direct a different proportion of the exhaust gas between the at least one exhaust gas passage and the bypass passage.

9. An exhaust gas cooler as claimed in claim 8, wherein the at least one coolant channel is formed from a pair of plates attached to one another.

10. An exhaust gas cooler as claimed in claim 8, wherein the bypass passage is enclosed in a housing and the housing is provided with a series of corrugations.

11. An exhaust gas cooler as claimed in claim 8, wherein the bypass passage is spaced away from the at least one exhaust gas passage by an insulating channel.

12. An exhaust gas cooler as claimed in claim 8, wherein the gas direction mechanism comprises a sleeve with an inlet and at least one outlet.

13. An exhaust gas cooler as claimed in claim 8, wherein there are at least two coolant channels which are adapted to allow coolant to flow therethrough at differing rates.

14. A method of manufacturing an exhaust gas cooler as claimed in claim 8, wherein:

the exhaust gas inlet;

the exhaust gas outlet;

the at least one coolant channel;

the coolant inlet and the coolant outlet; and the at least one exhaust gas passage;

are first brazed together in a furnace and then the bypass passage and gas direction mechanism are attached thereto.

15. An exhaust gas cooler as claimed in claim 8, wherein the gas direction mechanism is adapted to move from a first position where substantially all of the exhaust gas is directed through the bypass passage, to a second position where substantially all the exhaust gas is directed through the exhaust gas passage and also to a third position where a proportion of exhaust gas is directed through the bypass passage and a proportion of the exhaust gas is directed through the exhaust gas passage.

16. An exhaust gas cooler as claimed in claim 15, wherein the gas direction mechanism has a first face adapted to close a first aperture in order to direct the exhaust gas through the bypass passage and has a second face adapted to close a second aperture in order to direct the exhaust gas through the exhaust gas passage.

17. An exhaust gas cooler as claimed in claim 16, wherein the size of the gas direction mechanism is greater than the size of one of the first aperture and second apertures such that the gas direction mechanism is supported by the area around the aperture when in one of the first and second positions.

18. An exhaust gas cooler as claimed in claim 16, wherein at least one of the first and second faces is shaped such that it possesses rotational symmetry.

* * * * *